United States Patent
Selvam

(10) Patent No.: US 7,496,876 B1
(45) Date of Patent: Feb. 24, 2009

(54) METHOD FOR GENERATING INTEGRATED FUNCTIONAL TESTCASES FOR MULTIPLE BOOLEAN ALGORITHMS FROM A SINGLE GENERIC TESTCASE TEMPLATE

(75) Inventor: Punitha Selvam, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/124,616

(22) Filed: May 21, 2008

(51) Int. Cl.
    *G06F 17/50* (2006.01)
(52) U.S. Cl. .............................................. 716/5; 716/4
(58) Field of Classification Search .................. 716/4–5
    See application file for complete search history.

(56) References Cited

U.S. PATENT DOCUMENTS

| 4,860,291 | A | | 8/1989 | Damm et al. |
| 6,052,809 | A | | 4/2000 | Bowden |
| 6,063,132 | A | * | 5/2000 | DeCamp et al. ................ 716/5 |
| 6,732,338 | B2 | | 5/2004 | Crouse et al. |
| 6,760,892 | B2 | | 7/2004 | Taoka et al. |
| 7,353,472 | B2 | * | 4/2008 | DeMaris et al. ................ 716/4 |

* cited by examiner

*Primary Examiner*—Vuthe Siek
(74) *Attorney, Agent, or Firm*—Oppenheimer Wolff & Donnelly LLP; Robert M. Hirning

(57) ABSTRACT

One aspect of the present invention includes a method for generating functional testcases for multiple boolean algorithms from a single generic testcase template. In one embodiment, the method includes the preliminary step of creating a generic testcase template containing user-entered mask levels shapes and grouping the shapes within each mask level of the template. Next, testcase generation code comprising mask build language is developed to copy and rename the mask levels from the template into the desired input levels necessary to test a mask build operation. Finally, testcase generation code is executed to generate a testcase. The testcase generation code can be easily modified as necessary to change the mask levels. Additionally, shape interactions for new mask level builds can be added into the generic testcase template, allowing the template to be reused to generate additional testcases.

1 Claim, 3 Drawing Sheets

METHOD FOR GENERATING INTEGRATED FUNCTIONAL TESTCASES FOR MULTIPLE BOOLEAN ALGORITHMS FROM A SINGLE GENERIC TESTCASE TEMPLATE

FIELD OF THE INVENTION

The present invention generally relates to the testing and design of integrated circuits. The present invention more specifically relates to testcases used to perform testing on integrated circuit implant levels during the mask build process of the integrated circuit architecture.

BACKGROUND OF THE INVENTION

In the manufacture of integrated circuit chips, photolithography is used to form desired structures in chip materials (e.g., wafers). Masks are used to protect certain portions of the wafer, thus avoiding removal of defined portions of the wafer during the photolithography process. In this way, images and patterns are transferred to integrated circuit wafers based on the properties of the mask and the mask level designs which define the mask. The particular mask level designs in use, however, must be tested for their intended output in order to prevent bad mask builds. The success of bug-free mask builds are accordingly based on the testcases that verify the functionality and accuracy of the mask level build design for each mask level.

Known solutions exist to generate functional testcases to test mask level designs. One solution involves drawing a functional testcase specific to each mask level by hand. The drawback is that this manual drawing is time consuming, tedious, and error prone, and a manual testcase might not reflect the dynamically changing mask build recipes during development. Also, computerized tools exist which can generate testcases, but these tools require the mask build code developers to perform high level programming (such as with the C programming language or scripting languages like Tcl/Perl) to use the tools. This is a drawback for a typical Litho person who is not a programmer but is required to learn programming just to perform testcase generation to test a mask build recipe. Thus, these programming tools incur difficulty in creating the testcases for each mask level, and increase the software development TAT (turn-around-time) significantly.

The testing phase of integrated circuit chip design which includes designing these mask build algorithm testcases is as significant as the development phase in any software development cycle. The testing phase could, in fact, span more time than a development cycle due to the intensive stress testing of code functionality and error exceptions simulated in several possible use cases. Using the known available solutions presents not only difficulty in learning the tools but also difficulty in creating the various use cases to test the mask build algorithms.

What is needed is a simple way to create testcases for mask build algorithms by a Litho person using the same mask level knowledge that he or she already possesses.

BRIEF SUMMARY OF THE INVENTION

One aspect of the present invention involves creating an "integrated" testcase to test the functionality of the designs, algorithms, and recipes used for an integrated chip mask build. Accordingly, this testcase template can be utilized to produce numerous "integrated" testcases for multiple boolean algorithms for implant mask levels As a further aspect of the present invention, a variety of test shapes can be created at each mask level for a given technology product or test site. This enables production of test shapes at all block levels and critical levels, thus shortening the development cycle of the mask build code. In addition, the present invention enables a high flexibility of creating multiple sets of testcase combinations for testing mask builds at each mask level.

In one embodiment of the present invention, functional testcases are generated for multiple boolean algorithms from a single generic testcase template. As part of this method, the following steps are performed:

(1) Create a generic testcase template with shapes on user-defined levels (like AND1, NOT2, OR1 and so on) using an integrated circuit design layout editor.

(2) Group the shapes based on the common shapes operations (like AND1, AND2 and NOT1 interacting) used in the mask build. Steps (1) and (2) are only performed once in the development cycle.

(3) Develop the testcase generation code (in mask build language) to rename the levels in the template to the desired input levels for the mask build operation to be tested.

(4) Run the mask build testcase generation code through the shapes processing engine to generate the testcase.

(5) Change the mask build testcase generation code to a different set of levels for a different mask build recipe.

(6) Add new shapes encountered into the shape interaction library of mask level builds contained within the generic testcase template.

DETAILED DESCRIPTION OF THE INVENTION

In one embodiment of the present invention, integrated testcases for various shapes are created with the processing operations needed for building the implant mask levels from a single testcase template. This is accomplished by creating a testcase template with dummy levels like "AND1", "AND2", "NOT1", "NOT2", and the like, containing the most commonly used shape interactions between the dummy levels. Additionally, this method integrates the "testcase" with the actual implementation code used to create the mask levels.

This method disclosed by one embodiment of the present invention is unique because test shapes are created in an "integrated" fashion using a template of "levels" tied to intended operations. This method is versatile enough to potentially generate innumerable recipe configurations. For example, one aspect of the present invention would enable an OPC (optical proximity correction) code developer to generate all possible use-cases for a specific OPC algorithm using the same OPC development language, but for different execution sequences of the OPC code.

Use of the present invention may eliminate the dependency on an outside team to develop the testcase for the mask level, which may contribute to shortening TAT (turn-around-time) for the mask level development cycle. Also, time spent on the creation of a single testcase template would later save time for creating the testcase of each mask level testing for all chip designs (for example, the 50 or more mask levels which may be needed for a testsite or product to Release to Manufacturing (RTM)). Further, the present invention provides immediate testcase results for the mask level recipe being tested, and thus allows re-creation of the testcase reflecting any code changes with zero TAT.

Additionally, each of the testcase levels are tied to its intended shapes operation. The embedded test shapes generation code ensures the correct input shapes created for a specific mask level build recipe eliminate any outdated testcases being used for verification. The generic testcase template being built from the expertise acquired by the engineers can be used for any novice engineer developing the mask build recipe.

Figure 1:
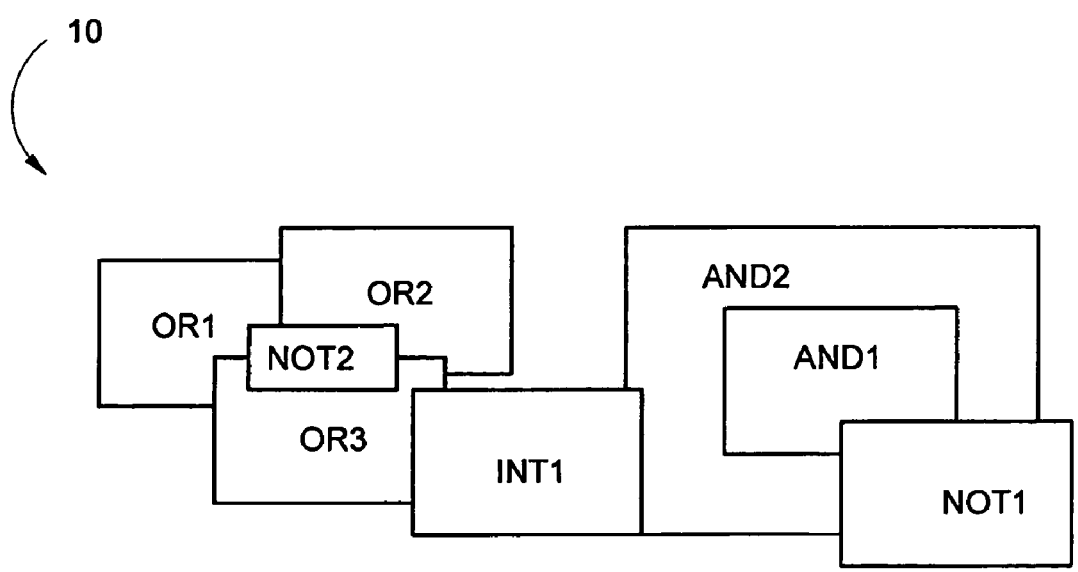
FIG. 1 illustrates an example testcase template in accordance with one embodiment of the present invention.

FIG. 1 illustrates a sample testcase template in accordance with one embodiment of the present invention. As shown in FIG. 1, testcase template 10 contains dummy levels such as "AND1", "AND2", "NOT1", "NOT2" and so on, arranged with commonly used shapes interactions between the dummy levels. One skilled in the art would recognize that a variety of shapes and shape interactions, including shapes not in a rectangular dimension, might be defined in this testcase template.

Figure 2:
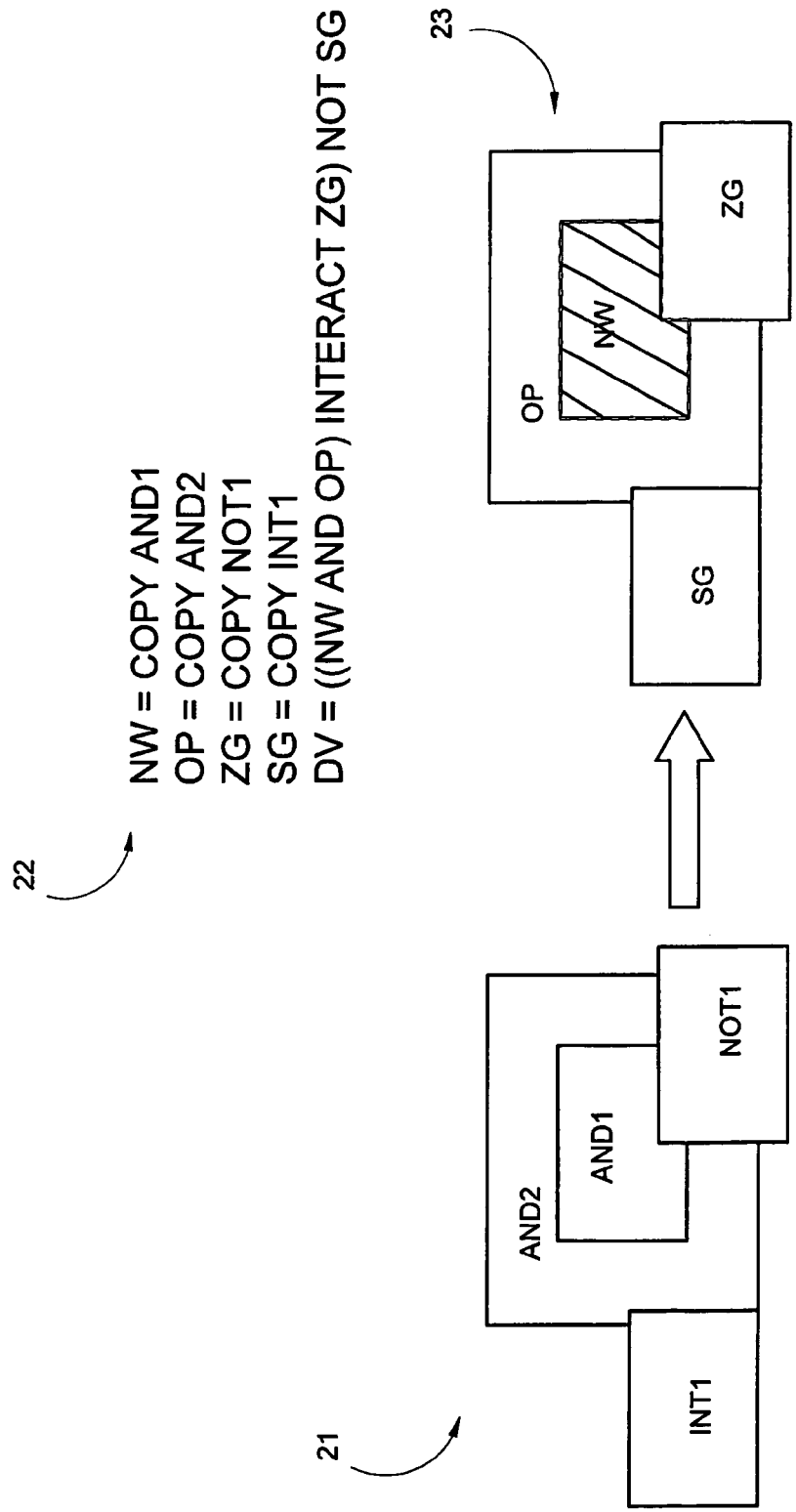
FIG. 2 illustrates an example output of a mask level from a testcase template in accordance with one embodiment of the present invention.

FIG. 2 illustrates an example output of a mask level from a testcase template in accordance with one embodiment of the present invention. As shown, testcase template 21 contains a number of dummy levels (AND1, AND2, NOT1, INT1) with a defined arrangement. To utilize the template, the layer conversion commands are written in the same shape processing language. For example, the instructions 22 to copy the shapes from template 21 are depicted as follows:

NW=COPY AND1
OP=COPY AND2
ZG=COPY NOT1
SG=COPY INT1

Accordingly, shapes SG, OP, NW, and ZG are defined in testcase 23. Following this layer conversion is a definition of the mask level creation code using the input levels. For example, to create a DV mask in the shaded area in the center of testcase 23, the command would be:

DV=((NW AND OP) INTERACT ZG) NOT SG.

Figure 3:
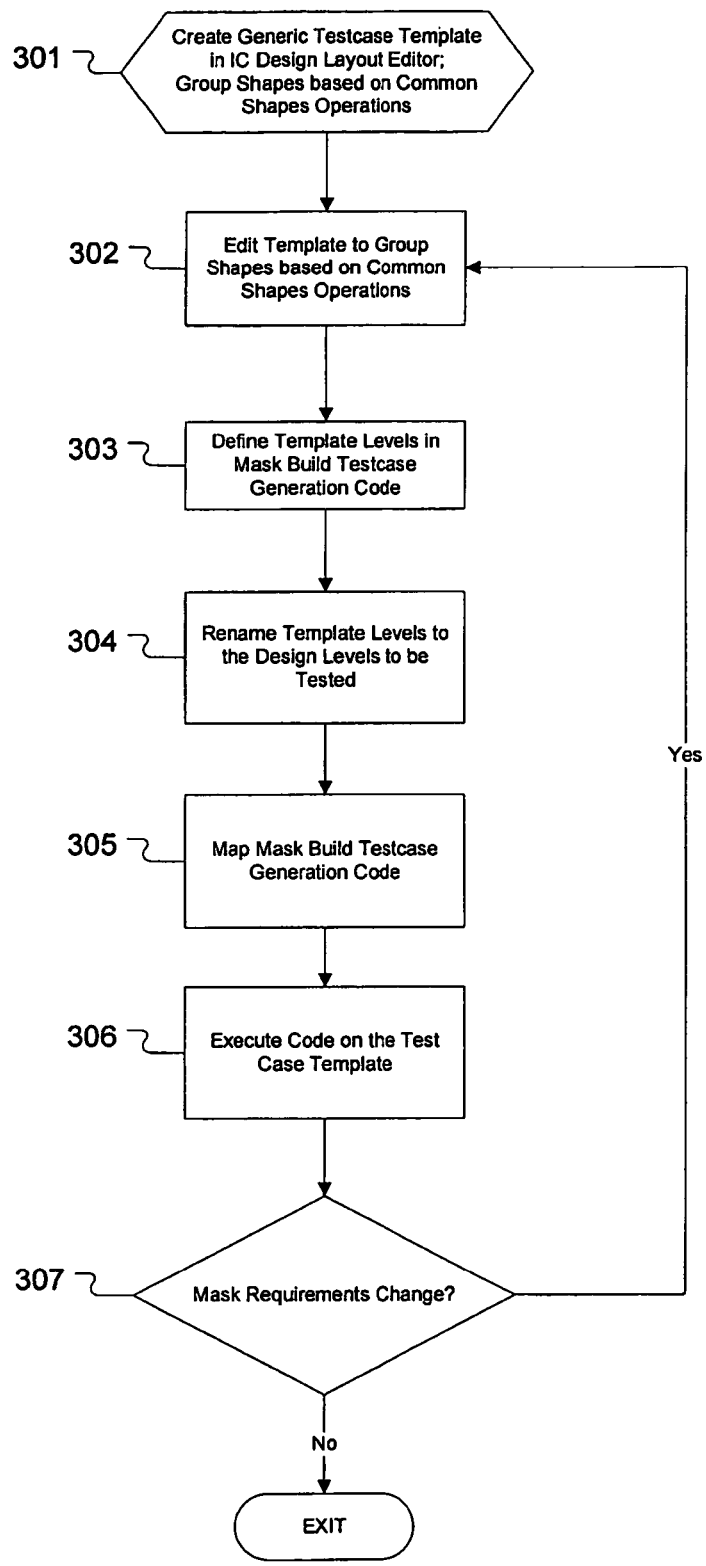
FIG. 3 illustrates an example operation of the method for generating functional testcases for multiple boolean algorithms from a generic testcase template in accordance with one embodiment of the present invention.

In a further embodiment of the present invention, FIG. 3 depicts a method for generating integrated functional testcases for multiple boolean algorithms from a generic testcase template in accordance with one embodiment of the present invention.

First, as in step 301, a generic testcase template is created containing shapes on user-entered levels (like AND1, AND2, NOT1, OR1, and so on) using an integrated circuit design layout editor. Next, as in 302, the template is edited to group the shapes based on common shapes operations (like AND1, AND2, and NOT1 interacting used in the mask build), to form the interactions of the levels which reflects the possible boolean operations. Accordingly, as in 303, the template levels in the mask build testcase generation code are defined.

Next, as in 304, the template levels are renamed to the design levels as appropriate to test the mask build operation on that level. For example, in the design depicted in FIG. 2, the operation to be tested would be DV=((NW AND OP) INTERACT ZG) NOT SG, where NW, OP, and ZG are design levels.

Next, as in 305, the mapping will be performed. Continuing on the example depicted in FIG. 2, the mask build testcase generation code will be mapped as follows: NW=COPY AND1; OP=COPY AND2; ZG=COPY NOT1; SG =COPY INT1. This test shape generation code will be invoked just before the mask build recipe code.

Next, as in 306, the code would be executed. Executing this code on the template data in FIG. 2 using the shapes processing engine will result in a testcase where the AND1 shape level is converted to NW, AND2 to OP, INT1 to SG, and NOT1 to ZG. The mask build testcase generation code can then be changed as necessary in 307 for any mask build recipe updates and/or any mask requirement changes.

As obvious from the sequence above, any desired mask build operation testing can be simulated by the user. The test shapes are always "regenerated" as the testcase generation code is executed along with the mask build recipe in the development environment.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for generating integrated functional testcases for multiple boolean algorithms from a single generic testcase template for verifying a mask build layout integrated circuit design, comprising:
   (a) creating a generic testcase template with dummy levels containing test shapes using an integrated circuit design layout editor, the test shapes defined within a plurality of user-entered mask levels;
   (b) grouping the test shapes within each mask level of the template based on common shapes interactions used in mask build operations;
   (c) selecting a subset of the mask levels from the template for use in a testcase, the testcase subsequently deployed in a mask build development environment to verify the mask build layout integrated circuit design;
   (d) developing testcase generation code containing instructions to copy and rename the selected mask levels into desired input levels of the testcase to verify the mask build layout integrated circuit design, wherein the testcase generation code comprises mask build language;
   (e) executing the generated testcase generation code with a shapes processing engine to generate mask build shapes within the testcase;
   (f) modifying the testcase generation code to change the mask levels and test distinct mask build layout integrated circuit design; and
   (g) adding shape interactions for new mask level builds into the generic testcase template and repeating steps (c)-(f) to generate new mask build shapes with the testcase to test additional mask build layout integrated circuit design.

* * * * *